United States Patent [19]
Bennett et al.

[11] 4,430,393
[45] Feb. 7, 1984

[54] METAL AMALGAMS FOR SODIUM-SULFUR BATTERY SYSTEMS

[75] Inventors: John E. Bennett; David E. Harney, both of Painesville, Ohio

[73] Assignee: Diamond Shamrock Corporation, Dallas, Tex.

[21] Appl. No.: 343,502

[22] Filed: Jan. 28, 1982

[51] Int. Cl.³ ............................................. H01M 10/36
[52] U.S. Cl. .................................... 429/101; 429/105; 429/201
[58] Field of Search ................ 429/101, 105, 108, 201

[56] References Cited

U.S. PATENT DOCUMENTS

| | | | |
|---|---|---|---|
| 2,863,933 | 12/1958 | Minnick et al. | 429/105 |
| 2,937,219 | 5/1960 | Minnick et al. | 136/6 |
| 2,996,562 | 8/1961 | Meyers | 136/6 |
| 3,408,229 | 10/1968 | Posey et al. | 429/110 |
| 3,433,672 | 3/1969 | Scholzel | 429/101 |
| 3,532,546 | 10/1970 | Harris | 136/83 |
| 3,573,987 | 4/1971 | Knight | 136/83 |
| 4,166,388 | 9/1979 | Rao | 429/194 |

FOREIGN PATENT DOCUMENTS

| | | | |
|---|---|---|---|
| 916362 | of 0000 | United Kingdom | |
| 1566215 | of 0000 | United Kingdom | |
| 834122 | 5/1960 | United Kingdom | 429/108 |

OTHER PUBLICATIONS

"Voltage Delay in Lithium Non-Aqueous Battery Systems," A. Leef and A. Gilmour, *Journal of Applied Electrochemistry*, 663 (1979).

"Capacity, Rate Capabilities and Rechargeability of a Lithium/Dissolved Sulfur Secondary Battery," R. D. Rawh, G. F. Pearson, S. B. Brummer, 77-6, *Proceedings of the Electrochemical Society*, 998 (1977).

*Primary Examiner*—Donald L. Walton
*Attorney, Agent, or Firm*—Woodrow W. Ban; Bruce E. Harang; Arthur S. Collins

[57] ABSTRACT

An alkali metal rechargeable battery utilizing an electrochemical reaction between an alkali or alkaline earth metal and sulfur. The metal is included in an amalgam anode.

10 Claims, 4 Drawing Figures

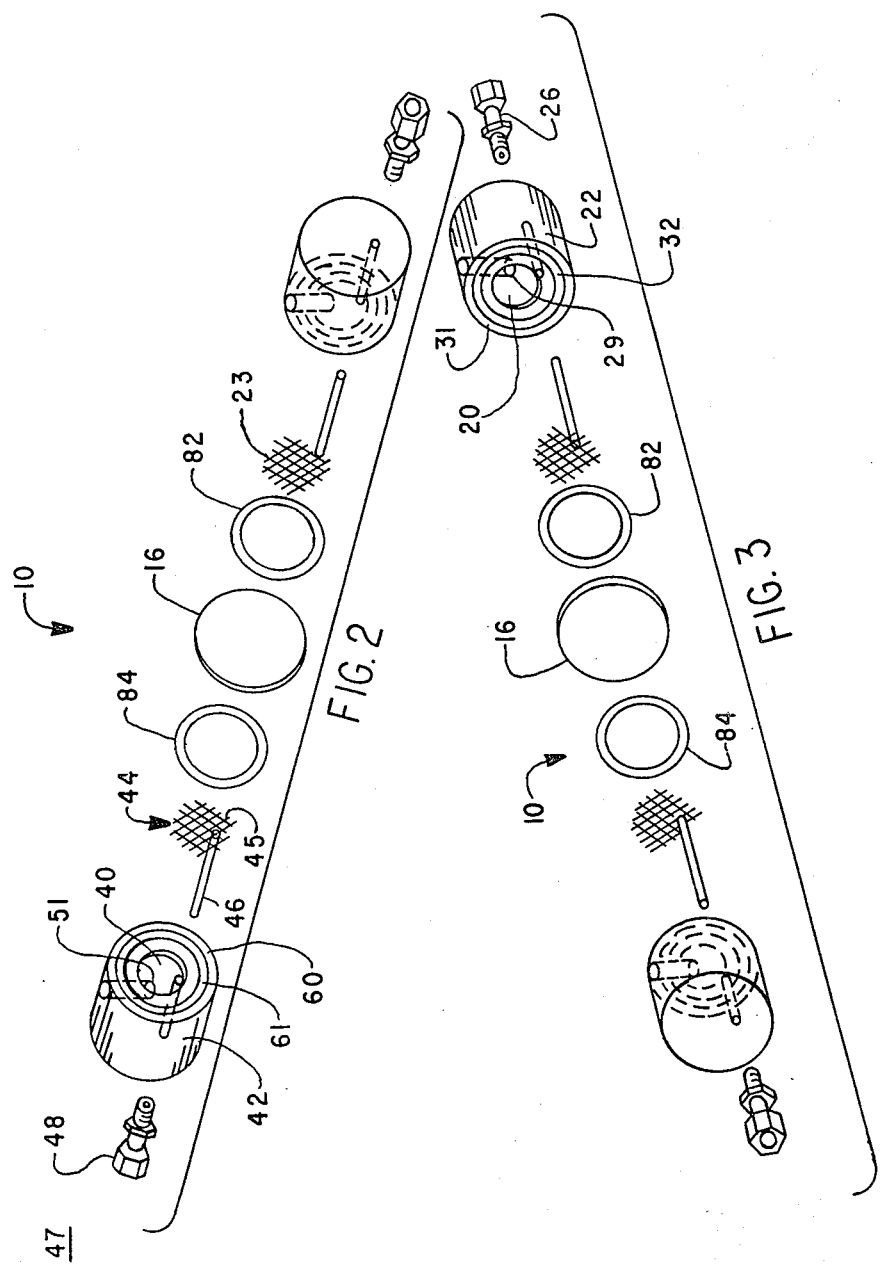

METAL AMALGAMS FOR SODIUM-SULFUR BATTERY SYSTEMS

FIELD OF THE INVENTION

This invention relates to electrical current storage batteries and more specifically to an apparatus and method for a rechargeable electrical current storage cell utilizing a reversible electrochemical reaction between an alkali or alkaline earth metal and sulfur for the storage and release of an electrical current.

Specifically this invention relates to particular anode materials and configurations for use in these cells.

BACKGROUND ART

The basic concept of chemical generation and storage of electricity is quite old. Batteries can be traced to 1795 when Volta discovered that two dissimilar metals, placed in an electrically conductive fluid establish an electromotive force from which an electric current can be tapped. Various materials employed as electrodes, a variety of electrolyte possibilities, and numerous combinations of electrodes and electrolytes subsequently have been the object of considerable experimentation for nearly 200 years.

Electrochemical cells generate power when two energetic materials participate in a controlled oxidation-reduction reaction occuring in an ionically conductive electrolyte. Electrons are transferred in the reaction, and these transferred electrons are collected and distributed by a pair of electrodes generally fabricated from metal, carbon, or the like. Electrons collected at one cell electrode are generally passed through an electrical load circuitry before being returned to the other electrode.

There are two basic electrochemical cell types. Secondary, or rechargeable cells generate electrical energy until some unacceptably low power output is reached caused by depletion of the reactants. Electrical current flow through the cell is thereupon reversed to cause a reversal of the oxidation reduction reaction by which the cell generates power. When a suitable portion of the cell reactants have undergone the reverse reaction, the cell is "recharged" and ready again to provide energy.

Primary cells generate power identically by an oxidation reduction until the reactants contained within the cell have essentially become spent. However, for a variety of reasons having their roots in the nature of the cell reaction or the cell physical configuration, current reversal to recharge the battery is not practical, and the cell is discarded or perhaps recycled.

In some battery development, emphasis has traditionally focused upon locating reactants producing a large amount of energy for a given reactant weight and volume. In addition, it has been necessary to locate conductive electrolytes, chemically compatible with the reactants. However, in larger rechargeable batteries, emphasis has traditionally focused upon improvements to battery electrodes and electrolytes aimed at producing a reasonably efficient battery at very low cost. As a result of this emphasis, these batteries have frequently incorporated individual electrochemical reactants to generate the electromotive energy producing relatively small amounts of energy for a given weight of reactants. As a result of such a low ratio of evolved energy to weight, relatively large amounts of the reactants necessarily have been included in these rechargeable batteries to produce a desired current over a required period of time. For example, according to theoretical calculations, the energy density capability of a lead acid storage battery is about 200 watt-hours per kilogram of reactants.

More recently, in an effort to develop transportation alternates for use in an impending world oil shortage, attempts have been made to power automotive vehicles utilizing electrically powered drive trains drawing electricity from storage batteries contained within the automotive vehicle. An automotive vehicle driven utilizing power provided by batteries carried within the vehicle is transporting the weight of not only the vehicle and its contents, but also of the storage batteries. It is known that vehicle efficiency is strongly dependent upon the weight carried within the vehicle. It has been found that automotive vehicles driven utilizing electrical current from conventional storage batteries having a relatively low energy density generally are not satisfactory. A conventional storage battery providing sufficient electrical current to operate a reasonably commodious automotive vehicle at acceptable speeds and over an acceptable distance is necessarily so weighty that efficient vehicle operation is impaired seriously.

Various attempts have been made to develop a rechargeable storage battery providing a relatively large amount of electromotive energy per unit weight of the battery. Those skilled in the art, referring to the Periodic Table of Elements, have long recognized the alkali and alkaline earth metals and sulfur as possessing the desirable high energy and low weight characteristics. Electrochemical reactions between lower atomic weight alkali metals and sulfur and between lower atomic weight alkaline earth metals and sulfur have been recognized as potentially providing relatively large energies of reaction from reactants of attractively low weight. For example, according to theoretical calculations, a lithium sulfur battery can produce 2600 watt-hours of energy per kilogram of reactants, a lithium iron disulfide battery about 1100 watt-hours.

A number of proposals have attempted to pair alkali or alkaline earth metals with sulfur to produce an efficient storage battery. Many of these proposals have related to primary batteries, that is, batteries designed to use the electrochemical energy of freshly activated battery reactants only once; recharging of these batteries not being contemplated. Alkali or alkaline earth metals reacting with sulfur in such primary batteries have been found to provide acceptable primary battery performance; particularly where an anhydrous electrolyte such as ammonia has been used in the battery. Under anhydrous conditions batteries utilizing, for example, a lithium-sulfur electrochemical reaction pair will produce adequate electrical voltage at operating temperatures significantly below those where an aqueous battery would have become nearly dormant.

Previous proposals for rechargeable batteries utilizing an electrochemical reaction pair involving an alkali or alkaline earth metal and sulfur have proven less satisfactory.

In one proposal, sodium and molten sulfur have been selected as the oxidation reduction reactants. However, the high temperature required in these sodium sulfur batteries has caused serious practical difficulties associated with both heat insulation, particularly of buses and bus connections, and the make-up supply of heat during periods of extended battery dormancy. Battery housing materials, by necessity, must resist both the elevated temperature and corrosive attack from the reactants. Impurities such as moisture are generally severely disfunctional to these batteries.

In another high temperature battery, lithium and iron disulfide in a molten salt electrolyte comprise the reactant pair. Beyond the same problems associated with high temperature sodium sulfur batteries, these lithium-iron disulfide cells can suffer from temperature induced iron disulfide instability and short cycle lives attibutable at least in part to material migration difficulties.

There have been proposals for the use of an alkali, or alkaline earth metal sulfur, cell-oxidation reduction reaction at ambient temperature. In one such proposal, alkali metal-sulfur electrochemical reaction pairs such as lithium-titanium disulfide or lithium-sulfur have been utilized in combination with organically based electrolytes including dissolved salts. Short cycle lives of such batteries combined with a slow reaction between the organic electrolyte and the alkali metals such as lithium or sodium have dampened development of such batteries. Further, no wholly satisfactory organic electrolyte has yet been found particularly with respect to ionic conductivity. A low ionic conductivity tends not to support adequate cell discharge rates.

In another proposal, electrochemical batteries have utilized a cation producing alkali or alkaline earth metal anode and sulfur cathode together with an electrolyte solute such as an inorganic nitrate or perchlorate of the metal cation dissolved in a cell fluid such as ammonia. Such cells or batteries have demonstrated a capability of being recharged but also have demononstrated rapid decay in cell performance as measured by a reduced current and voltage output of the cell with each subsequent recharging. This decay in cell performance has been attributed to competing reactions between the chemical reactants within the cell, thereby reducing the quantity of chemicals available for storage of current.

It has been further proposed that such cells be divided to separate cell chemical components from one another in an effort to reduce the competing reactions between the electrochemical components. Division has not yet produced a wholly effective rechargeable alkali metal or alkaline earth metal-sulfur battery cell. One significant factor interfering with effective divided cell performance has centered about difficulties in finding a satisfactory divider material that resists destructive effects of fluids in the cell and yet passes metal cations. Another factor has been lack of a suitable supporting electrolyte for use in the cells that does not contribute significantly to competing cell reactions.

Water has long been a favored electrolyte solvent for use in rechargeable batteries. Water has not proven successful as an electrolyte solvent for batteries utilizing alkali and alkaline earth metal-sulfur reactions. Many of the metals react violently with water, and most forms of sulfur useful in the battery reaction are at best insufficiently soluble in the water.

Liquid ammonia exhibits many of the properties that make water a highly desirably battery electrolyte solvent. $NH_3$ is highly hydrogen bonded, resulting in an unusually elevated boiling point and a substantial heat of vaporization. Ammonia is a protonic, ionizing solvent superior to virtually all but water in dissolving a wide range of electrolyte salts; some salts conduct electricity better in $NH_3$ than in water.

Yet there are differences between water and liquid ammonia. $NH_3$ liquid is known to dissolve alkali and alkaline metals to form solutions of a metallic nature when concentrated. These so-called bronzes generally possess characteristics of both electronic and ionic conductance. Such dual properties can be attractive in batteries.

These bronzes have been generally recognized as thermodynamically unstable; some literature reporting half lives as short as 190 hours. Such half lives would preclude utility in most secondary battery applications.

Ammonia is characterized by a theoretical dissociation voltage of 77 millivolts at 25° C. Such a low voltage would seem to seriously limit the use of ammonia in batteries wherein individual cell voltages of in excess of one volt are highly desired. Later evidence has indicated that the actual dissociation voltage of ammonia is significantly in excess of 77 millivolts as a result of significant electrode overvoltages. For these and other reasons, except for use in some primary batteries wherein the ammonia was introduced into the battery immediately prior to battery use, ammonia and ammonia bronzes have not been utilized extensively in batteries.

The use of sulfur as a cathode in conjunction with an ammonia solvent has been suggested since sulfur readily dissolves in ammonia. The kinetics of cell electrochemical reactions in which elemental sulfur is dissolved in ammonia together with such supporting electrolytes have been determined to be quite slow, potentially limiting current flow rates when applied to batteries. Previous proposals have attempted to utilize a sulfur cathode in conjunction with an ammonia electrolyte by the addition of compounds such as alkali metal nitrates, perchlorates, thiocyanates, and the like.

It is with cell dividers that additional difficulties with alkali or alkaline earth metal sulfur batteries have been encountered and particularly those with an ammonia electrolyte solvent. It is desirable to separate sulfur from the anode vicinity in such cells to reduce competing cell reactions. Until now, a substantially satisfactory cell separator or partition has not been developed that would (1) retain sulfur in a cell cathode compartment, (2) readily transport cell metal cations, and (3) resist both cell chemical corrosiveness and blocking by products of competing cell reactions.

Bronzes, in addition have been found particularly aggressive to many separator materials that would otherwise be desirable for use in such batteries. These bronzes are believed to enhance formation of reaction by products of the metal and sulfur upon the membrane, interfering with membrane performance. Were it possible to shield separators in such cells from bronzes used in the cells, separators having desirable cation performance characteristics but vulnerable to sulfur contamination might be utilized in the cells.

DISCLOSURE OF THE INVENTION

The present invention provides an anode and rechargeable electrical storage battery configuration utilizing an electrochemical reaction between an alkali metal or alkaline earth metal and sulfur.

A battery made in accordance with this invention includes a housing surrounding a central chamber. A partition divides the chamber into two compartments. In one preferred embodiment, the partition is sealed to the housing to substantially resist movement of fluids between compartments.

A liquid amalgam anode is placed within one of the compartments and electrically connected with the outside of the housing. A cathode of a suitable or conventional type is positioned within the other compartment in electrical communication with the outside of the housing. The compartment containing the cathode also contains a catholyte fluid that includes sulfur or metal polysulfides. A provision is made for equalizing pressure between the compartments.

The liquid anode is an amalgam including anhydrous ammonia and a desired alkali or alkaline earth reactant metal together with mercury. In liquid anodes prepared for use in cells of this invention, the reactant metal will be present in the anhydrous ammonia in a range of less than about 40 weight percent of the amalgam. The catholyte is a blend of anhydrous ammonia and sulfur or anhydrous ammonia and polysulfides corresponding to the metal comprising the liquid anode or a mixture of both sulfur and metal polysulfides in anhydrous ammonia.

It is a surprising and unique aspect of this invention that this catholyte supports adequate cell current flow best absent supporting electrolytes, contrary to the thinking and practice in the prior development of batteries relying upon a reaction between an alkali or akaline earth metal and sulfur.

Where a partition separates the compartments in liquid sealing relationship, the partition separating the compartments is of a type freely permeable to cations of the metal but substantially resisting passage of sulfur and metal polysulfides between the compartments. During discharge of the battery, cations of the metal are released by the liquid amalgam anode producing electrons within the anode solution. These cations pass through the partition from the anode compartment to the cathode compartment. The cations react with sulfur usually in the form of metal polysulfides in the cathode compartment which absorbs electrons from the cathode. Upon recharging of the battery, the sulfur surrenders electrons to the cathode, and the metal cations pass through the partition from the cathode compartment to the anode compartment returning to the liquid anode where electrons are reabsorbed.

In a preferred embodiment, the liquid anode is formed by contacting lithium or sodium metal with mercury. Where sodium-mercury amalgam forms the liquid anode, the sodium is present in the amalgam in a concentration range less than about 50 weight percent. Where the amalgam is prepared with lithium metal and mercury, the lithium metal is present in the amalgam in less than about 5 atom percent. In an alternate preferred embodiment, the liquid anode also includes a bronze of the metal and ammonia. For sodium the bronze is between about 60% of saturation and saturation, while for lithium the bronze is between about 12 and 40 percent of saturation.

The catholyte is prepared by blending polysulfides corresponding to the metal of the liquid anode into anhydrous ammonia. Where the liquid anode metal is sodium, the catholyte is prepared by blending sodium polysulfides in a composition range of from $Na_2S_4$ to $Na_2S_{18}$ and in concentration of from 2 moles per liter to saturation in the ammonia. Where the liquid anode metal is lithium, the catholyte is prepared by blending lithium polysulfides in a range of composition of from $Li_2S_4$ to $Li_2S_{18}$ and in a range of concentration of from 2 moles per liter to saturation in the ammonia.

Generally, cells utilizing catholytes employing shorter chain polysulfides tend to exhibit reduced voltage and current characteristics from those utilizing longer chain polysulfides. Cells utilizing longer chain polysulfides tend to undergo more rapid decay in cell performance following successive rechargings than cells utilizing shorter chain polysulfides. Polysulfides including a range of between $Li_2S_4$ and $Li_2S_{18}$ and including a range of between $Na_2S_4$ and $Na_2S_{18}$ provide a generally satisfactory compromise between cell life and cell efficiency.

In one version of a preferred embodiment, the partition is a thin sheet membrane formed from a blend of materials that includes a substantial proportion of a copolymer of polyethylene and methacrylic acid or a copolymer of polypropylene and methacrylic acid or a polyethylene cation exchange membrane radiation grafted with sulfonic or carboxylic acid. Depending upon the nature of the cell chemicals, a microporous membrane such as microporous polypropylene, microporous alumina or glass frit may be utilized. It has been found that sulfur migration across the partition is a significant contributor to decay in cell performance following repeated recharging and that the selection of a membrane for a particular cell will be governed to a large degree by its resistance to sulfur migration in the particular cell environment.

In one preferred embodiment, the partition is arranged whereby the amalgam is disposed between the partition and bronze contained in the anode compartment, whereby the partition is shielded from contact with bronze material that might be chemically aggressive to the partition.

The above and other features and advantages of the invention will become apparent from the following detailed description of the invention made with reference to the accompanying drawings which form a part of the specification.

DESCRIPTION OF THE DRAWINGS

FIG. 2 is an exploded view of the cell of FIG. 1 viewed from the anode end of the cell.

FIG. 3 is an exploded view of the cell of FIG. 1 from the cathode end of the cell.

BEST MODE FOR CARRYING OUT THE INVENTION

Figure 1:
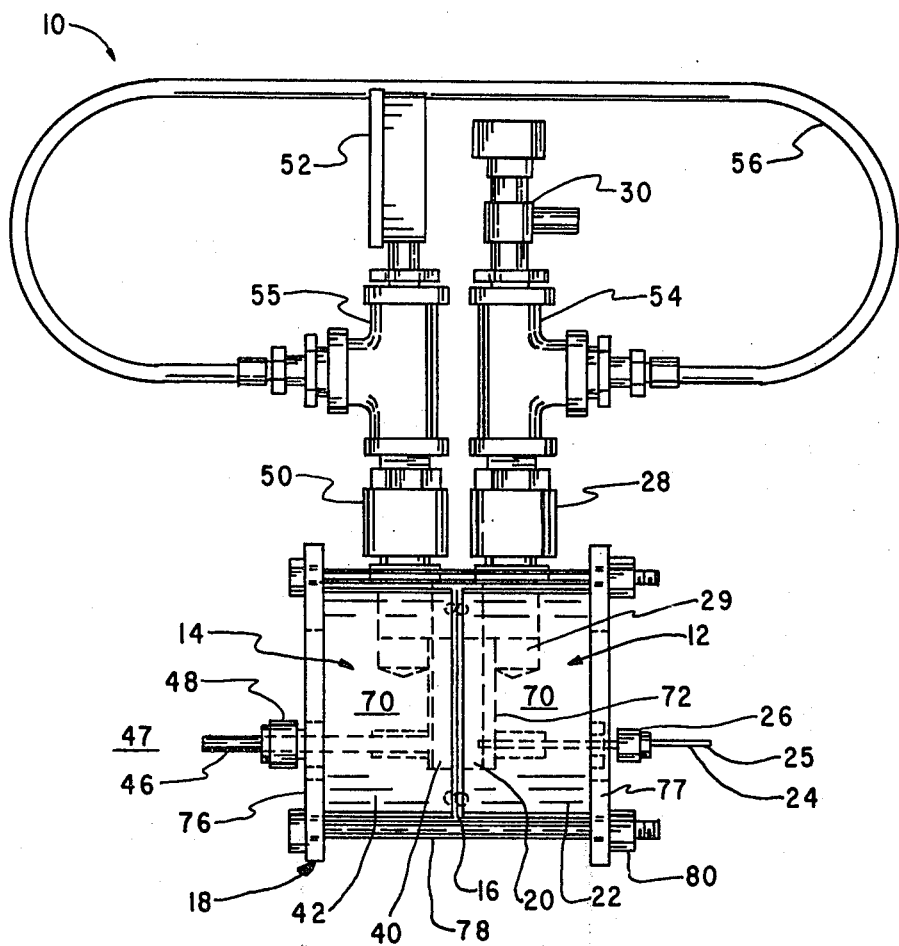
FIG. 1 is a frontal view of a battery cell made in accordance with this invention.

Referring to the drawings, an electrical storage battery cell 10 is shown in FIGS. 1–3. The cell is comprised of an anode subassembly 12, a cathode subassembly 14, a divider 16 or partition separating the subassemblies and a retaining assembly 18 joining the subassemblies. Assembled and properly filled, the cell is capable of rechargeably storing and releasing electrical current utilizing electrochemical reactions.

The anode subassembly is comprised of an anode compartment 20 formed by any suitable or conventional method within a generally cylindrical anode subhousing 22, and an anodic electrical current connector 24 or feeder between the compartment 20 and a point 25 outside of the subhousing 22. The electrical connector 24 is fabricated from a suitable or conventional material such as titanium, stainless steel or the like. A fitting 26 supports the electrical connector 24 within the anode compartment 20 and performs as a seal, cooperating with the electrical connector 24 to resist leakage of fluid contained in the anode compartment 20 along the electrical connector 24 to the exterior of the subhousing 22 while the cell 10 is assembled and in use.

A fluid inlet 28 is provided for introducing a liquid anode into the anode compartment. A fluid passage 29 communicates fluid through the subhousing 22 from the fluid inlet 28 to the anode compartment 20. A valve 30 is provided to retain fluid within the anode compartment.

The subhousing 22 includes a mating surface 31. A groove 32 of a size and shape suitable for receiving an "O" ring is formed in the mating surface.

When assembled into a cell, the anode subhousing is subject both to internal pressure generated by chemicals such as ammonia contained within the cell and to chemical attack by those contained chemicals. The housing, therefore is formed from a material resistant to attack by chemicals contained within the cell and of a sufficient thickness and strength to withstand pressures anticipated within the anode compartment during operation of an assembled cell. In the best embodiment, the anode subhousing 22 is formed from a plastic material such as polyethylene, polypropylene, or the like.

The cathode subassembly 14 is comprised of a cathode compartment 40 formed by any suitable or conventional method within a generally cylindrical cathode subhousing 42 and a cathode 44. Like the anode subhousing 22, and for the same general considerations, the cathode subhousing 42 is formed from a plastic material such as polypropylene, polyethylene or the like of a sufficient thickness and strength to withstand pressures anticipated within the cathode compartment during operation of an assembled cell.

The cathode 44 is comprised of a generally circular metal mesh structure 45, and an electrical connector 46 fixedly supporting the mesh structure 45, and electrically communicating between the mesh structure 45 and a point 47 outside the cathode subhousing 42. A cathode seal fitting 48 retains the electrical connector 46 in a predetermined position within the cathode compartment 40, thereby positioning the mesh structure 45 within the cathode compartment 40.

In the best embodiment, the cathode 44 is a dimensionally stable electrode comprising a generally well-known valve metal such as titanium, or the like, coated with an oxidized metal coating system such as Diamond Shamrock CX-DSA ®, a proprietary Diamond Shamrock Corporation electrode coating system producing an electrode surface containing tin, ruthenium, and titanium oxides, or the like. Depending upon the chemicals utilized within the cell, other suitable or conventional cathode materials, including but not limited to, other valve metals coated with suitable coating systems, and carbon, may be used. Any such other cathode materials utilized must be relatively impervious to attack by chemical compounds contained or naturally occurring within the cell. Any alternate cathode materials must be of a suitable or conventional type for catalyzing the electrochemical reaction of sulfur or the alkali metal polysulfides.

A cathodic fluid inlet 50 is provided upon the cathode subhousing 42 for introducing a catholyte liquid into the cathode compartment 40. An inlet passage 51 communicates through the subhousing 42 between the fluid inlet 50 and the cathode compartment 40. A stopper 52 is provided to retain catholyte within the cathode compartment 40 when the cell is assembled. In the best embodiment, this stopper 52 also performs as a pressure gauge.

Connections 54, 55 are provided respectively on the anode fluid inlet 28 and the cathode fluid inlet 50. These connections are joined by a conduit 56 whereby pressures in the anode compartment 20 and the cathode compartment 40 can be equalized.

The cathode subhousing 42 includes a mating surface 60. A groove 61 is formed in the mating surface of a size and shape suitable for receiving an "O" ring.

The subassemblies 12, 14 are joined utilizing the retaining assembly 18 to form the electrical storage cell 10. The mating surfaces 31, 60 of the subhousing 22, 42 are pressed together joining the subhousing 22, 42 and compartments 20, 40 into a generally cylindrical housing 70 having a central chamber 72 as shown in phantom in FIG. 1. Retaining plates 76, 77 are positioned at each end of the housing and the plates are connected by strain rods 78 threaded over a portion of their length and attached to the plates, using fasteners 80. Tightening the fasteners presses the mating surfaces 31, 60 together.

The divider or partition 16 separates the anode and cathode compartments 20, 40 of the chamber 72. An "O" ring 82 is carried in one of the grooves 32, 61. The divider 16, of a size somewhat larger than a diameter of the "O" ring, is positioned between the mating surfaces 31, 60 and is then pressed into the unoccupied groove, if flexible, or against a second "O" ring 82 as the fasteners 80 are tightened to force the mating surfaces one toward the other. Interaction between the grooves 32, 61, the "O" ring 82, the second "O" ring, if used, and the divider 16 effectively seals against fluid communication between the compartments and fluid leakage from the chamber between the mating surfaces.

Typically, the anode compartment of a completed cell is charged with a liquid anode formed by contacting an alkali metal or alkaline earth metal such as lithium, sodium, or the like, with mercury to form a liquid amalgam. The cathode compartment is charged with a catholyte such as ammonia containing dissolved sulfur either in the form of elemental sulfur or in the form of metal polysulfides corresponding to the anode metal. These sulfur sources, polysulfides and elemental sulfur, for convenience are termed sulfur. Typically, where the anode metal is lithium, the corresponding polysulfide is one of, or a mixture of, polysulfides ranging in composition from $Li_2S_4$ to $Li_2S_{18}$. When the anode metal is sodium, the corresponding polysulfide is one of, or a mixture of, polysulfides ranging in composition from $Na_2S_4$ to $Na_2S_{18}$. At least two molar solutions of the polysulfides are utilized.

The divider 16 retains electrochemical reactants, that is, the liquid anode and the catholyte, within the compartments, but is freely permeable to cations of the anode metal. The divider particularly must function to retain sulfur within the cathode compartment. Sulfur entering the anode compartment reacts with the liquid anode, removing reactants from electrochemical activity within the cell, and decreasing the electrochemical capacity that can be stored within and released from the cell, as well as interfering with movement of cations through the divider.

A number of materials have been found effective in inhibiting migration of sulfur from the cathode compartment to the anode compartment while remaining freely permeable to anode cations. An effective group of partitions has been identified as polyethylene or polypropylene based cation exchange membranes that include functional groups of sulfonic or carboxylic acid such as a polyethylene cationic exchange membrane radiation grafted with sulfonated styrene, manufactured as R-5010 by RAI Research Corporation. Membranes containing a substantial proportion of a copolymer of polyethylene and acrylic or methacrylic acid, or a copolymer of polypropylene and acrylic or methacrylic acid, such as Permion® 2291 40/20 or Permion® E-6001 membranes manufactured by RAI, or EAHT-1575 membranes manufactured by SAC, have been found to perform effectively as dividers. Other effective dividers have been found to be partitions having sintered glass "windows", microporous polypropylene membranes such as Cellgard® 5511, Daramic® microporous membranes formed from glass filled polypropylene, dividers of microporous alumina and elastomeric membranes including an alumina "window".

The amalgam can be any suitable or conventional liquid amalgam of the alkali or alkaline earth metal with mercury. Preferred alkali or alkaline earth metals include lithium, sodium, potassium and calcium.

With mercury, sodium forms an amalgam at under ½ weight percent concentration, but also forms a liquid (eutectic) amalgam at approximately 50 weight percent. Similar amalgams exist for the various alkali and alkaline earth metals desirable for use in the batteries of the instant invention.

Where the amalgam is to function as a reservoir of the alkali or alkaline metal within the battery, it is desirable to utilize an amalgam including a substantial proportion of the alkali or alkaline earth metal. However, where a reservoir of the alkali or alkaline earth metal is to be provided in the anode compartment, then an amalgam of relatively reduced alkali or alkaline metal content may be utilized.

Figure 4:
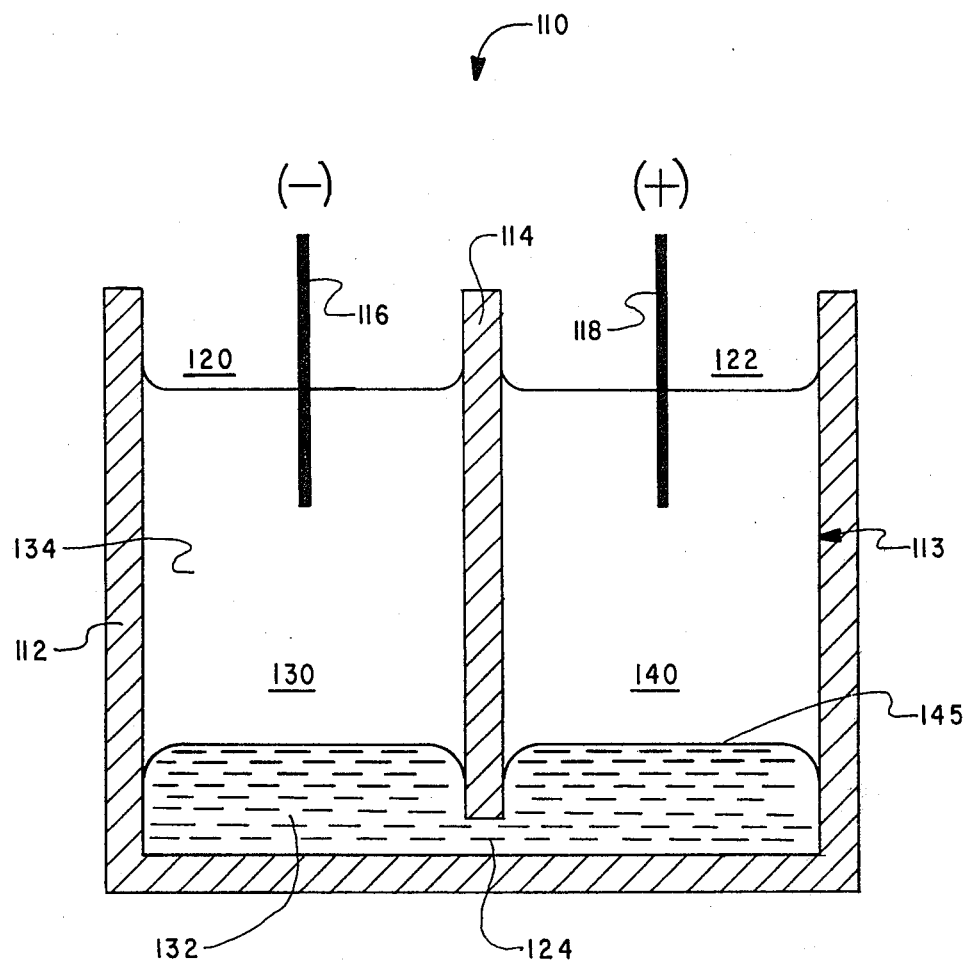
FIG. 4 is a cross sectional view of an alternate embodiment of a rechargeable battery of the instant invention.

Referring to the drawings, FIG. 4 shows an electrolytic cell 110. The cell comprises a housing 112 defining a central chamber 113, a divider 114, an anode current collector 116, and a cathode 118. The divider 114 separates the chamber 113 into an anode compartment 120 and a cathode compartment 122. The divider is discontinuous within the housing defining an aperture 124 for liquid communication between the compartments.

The anode compartment 120 includes a liquid anode 130 having an amalgam phase 132 and a bronze phase 134. It may be seen that the amalgam phase extends into the cathode compartment utilizing the aperture. The amalgam phase should be more dense than the bronze phase. The anodic current collector 116 contacts the liquid anode 130, extending through the housing to provide for external electrical communication with the liquid anode.

The cathode chamber 122 includes a catholyte 140 of anhydrous ammonia and sulfur or polysulfides of the anode metal. The catholyte is prepared in accordance with this best embodiment. The cathode 118 protrudes through the housing establishing electrical communication between the catholyte and a point exterior to the housing.

Material of construction considerations for the housing are similar to those applicable to the cell of FIG. 1. The divider 114 may be fabricated from the same material as the housing 112.

An interface 145 occurs between the catholyte and the amalgam. A layer of sulfide of the alkali or alkaline metal, M₂S or MS collects along this interface and functions to at least partially restrict material transfer through the interface. The bronze and the catholyte are effectively precluded from contact, thus effectively blocking a substantial proportion of disfunctional cell side reactions.

Referring to FIG. 1, it may be seen that the cell 10 depicted in Fig. 1 also may be used with a two phase liquid amalgam-bronze anode. By rotation of the cell 90° so that the anode compartment 20 rests vertically above the membrane divider 16. Amalgam placed in the anode compartment then rests upon the membrane, shielding the membrane from bronze introduced into the anode compartment. It may be desirable to provide a reinforcing support for the membrane in this configuration.

Use of bronze as a reservoir of alkali or alkaline earth metal for the amalgam is important. Were the metal introduced into the anode compartment in the ground state, the metal would quickly join the amalgam, and, if sufficient ground state metal is added, the amalgam ceases to be fluid. This nonfluid condition is precluded by the presence of the bronze. Attractive forces between the anhydrous ammonia in the bronze and the alkali or alkaline earth metal tend to discourage formation of an amalgam of semiliquid or nonliquid nature.

The cell reactions for a cell made in accordance with this invention and utilizing a catholyte containing monovalent metal polysulfides of the form $M_2S_x$ have been postulated as follows:

at the anode: $2M \longrightarrow 2M^+ + 2e^-$ at the cathode: $2M^+ + (x - 1)M_2S_x + 2e^- \longrightarrow x\, M_2S_{(x-1)}$ for a reversible cell reaction of:

$$2M + (x - 1)M_2S_x \xrightarrow{2F} x\, M_2S_{(x-1)}$$

A similar cell reaction has been postulated for divalent metal polysulfides of the form $MS_x$ to wit:

$$M \longrightarrow M^{++} + 2e^-$$

$$M^{++} + (x - 1)M_2S_x + 2e^- \longrightarrow x\, MS_{(x-1)}$$

for a reversible cell reaction of:

$$M + (x - 1)MS_x \xrightarrow{2F} x\, MS_{(x-1)}$$

Similar reactions will be apparent to those skilled in the art for cells empoying catholyte containing only sulfur.

The following example further illustrates the invention:

EXAMPLE 1

A cell prepared in accordance with the best embodiment of this invention and including polypropylene cell walls, a screen-like cathode having a high surface area DSA$^R$ precious metal oxide coating applied to the cathode, and a ¼" titanium rod functioning as a current collector in the anode compartment. The cell was separated by an RAI R5010 high density polyethylene membrane.

The anode compartment was loaded with 14 milliliters of mercury, and 1.75 grams of sodium metal. The cathode compartment was loaded with 21 milliliters of anhydrous ammonia and 5 milliliters of $Na_2S_{10}$.

Upon closure, the cell displayed an initial discharge voltage of 1.57 volts and an internal resistance of 1.3 ohms at 100 milliamperes discharge current. The cell was alternately discharged for one hour and charged for 1.5 hours at approximately 100 milliamperes for 720 hours, at the end of which time the cell was disassembled for inspection. Inspection revealed the membrane to be clean having no bumps, and that considerable sulfur had migrated from the cathode to anode compartments through the membrane without causing severe disfunction within the cell.

Although a single embodiment of a preferred form of the invention has been illustrated and described in detail, the present invention is not to be considered limited to the precise construction disclosed. Various adaptions, modifications and uses of the invention may occur to those skilled in the art to which the invention relates, and it is intended to cover all such adaptions, modifications, and uses which come within the spirit or scope of the appended claims.

What is claimed is:

1. In a rechargeable battery utilizing an electrochemical reaction pair of sulfur and a metal selected from the group consisting of the alkali metals and the alkaline earth metals comprising:
   (1) a chamber;
   (2) a partition, at least partially separating said chamber and thereby defining an anode compartment and a cathode compartment;
   (3) a cathode in said cathode compartment in electrical communication between said anode compartment and a point external to said chamber;
   (4) an anode at least partially contained in said anode compartment in electrical communication between said cathode compartment and a point external to said chamber; and
   (5) anhydrous ammonia electrolyte; characterized in that said anode is a liquid amalgam containing substantially mercury and said metal.

2. The battery of claim 1 including a bronze of the metal and anhydrous ammonia in contact with the amalgam within the anode compartment.

3. The battery of claim 1 including a cation exchange material separating the compartments, the amalgam being contained in the anode compartment.

4. In a rechargeable battery utilizing an electrochemical reaction pair of sulfur and a metal selected from the group consisting of the alkali metals and the alkaline earth metals comprising:
   (1) a housing defining a central chamber;
   (2) a partition, at least partially separating said chamber and thereby defining an anode compartment and a cathode compartment;
   (3) a cathode in said cathode compartment in electrical communication between said anode compartment and a point external to said chamber;
   (4) an anode at least partially contained in said anode compartment in electrical communication between said cathode compartment and a point external to said chamber; and
   (5) anhydrous ammonia electrolyte; characterized in that said anode is a liquid amalgam containing substantially mercury and said metal.

5. The battery of claim 4 wherein the partition separates the compartments in liquid sealing relationship, the partition being selectively permeable by ions of the metal, the metal being selected from a group consisting of sodium, lithium, potassium and calcium.

6. The battery of either of claims 4 or 5 including a bronze of the metal contained in the anode compartment in contact with the amalgam, the metal being selected from a group consisting of sodium, lithium, potassium, and calcium.

7. The battery of claim 6 partition being arranged whereby the amalgam is interposed between the partition and the bronze.

8. The battery of claim 4 wherein said metal is present in amounts of less than about 50 weight percent of said amalgam.

9. The battery of claim 8 wherein said metal is sodium.

10. The battery of claim 4 wherein said metal is sodium or lithium.

* * * * *